UNITED STATES PATENT OFFICE.

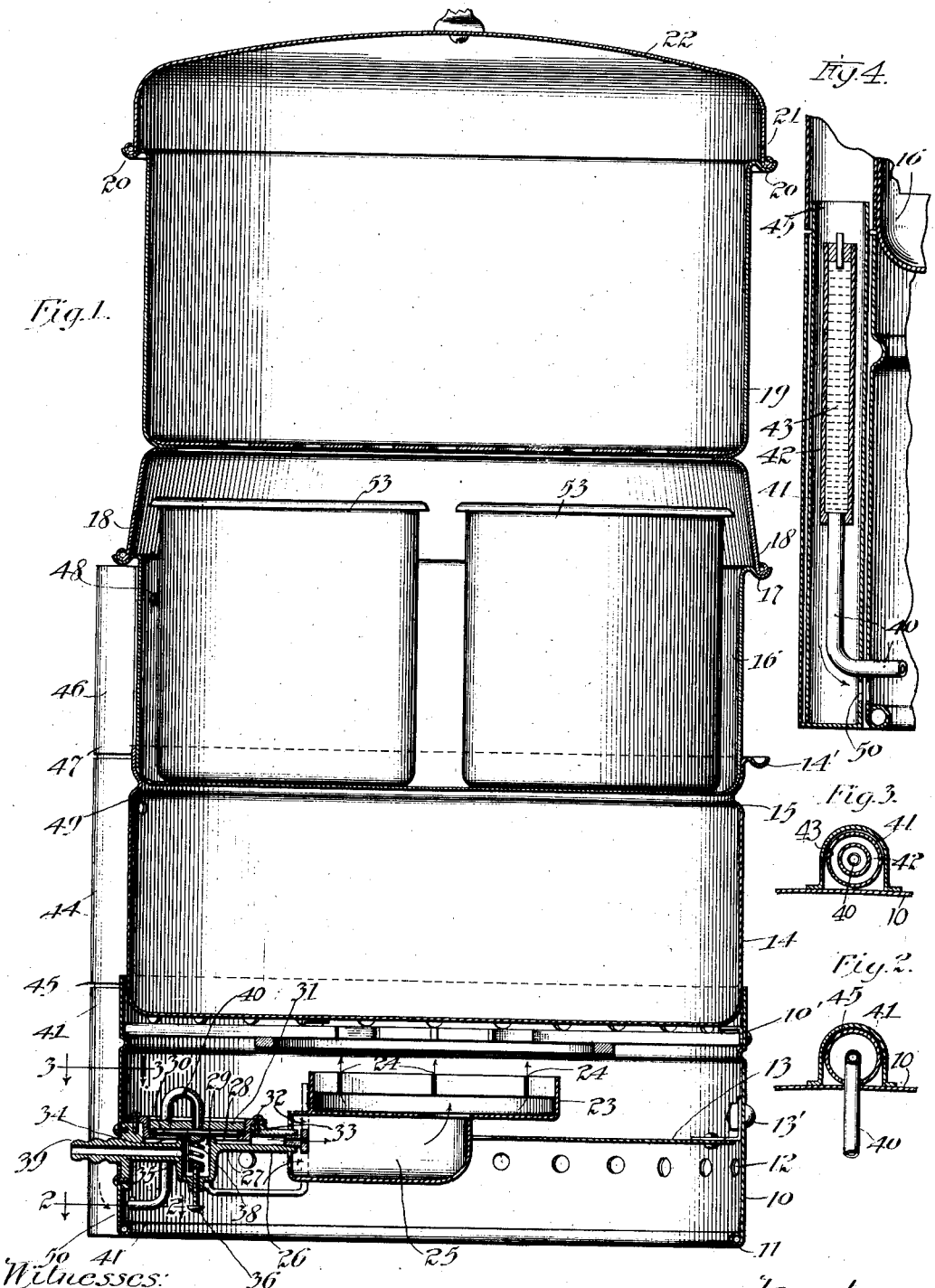

NOAH S. HARTER, OF WAUKEGAN, ILLINOIS, ASSIGNOR TO THE HARTER COMPANY, OF WAUKEGAN, ILLINOIS, A CORPORATION OF ILLINOIS.

CULINARY UTENSIL.

1,112,447.   Specification of Letters Patent.   Patented Oct. 6, 1914.

Application filed February 9, 1914. Serial No. 817,635.

*To all whom it may concern:*

Be it known that I, NOAH S. HARTER, a citizen of the United States, residing at Waukegan, in the county of Lake and State of Illinois, have invented certain new and useful Improvements in Culinary Utensils, of which the following is a specification.

My invention relates to improvements in culinary utensils, and has especial reference to devices of this general character wherein the variation of the interior temperature of a cooking vessel thereof serves to control the application of heat thereto.

One of the general objects of my invention is to automatically control a source of heat supply, or fuel, when temperature within the heating chamber of the cooking vessel rises above, or falls below, a predetermined degree.

Another object of my present invention is to provide a temperature-responsive device, and to locate it within an auxiliary chamber or flue adjacent to and communicating with, but separated from the cooking chamber, and to provide one such flue for each vessel or a series of such vessels so that each vessel may contribute toward the regulation of the fuel supply. And still another object of my invention is to provide means for causing a reverse draft, of relatively cold air to pass through the auxiliary chamber, or flue containing the fuel controlling device from the superposed sections of flues, when the top, or cover, of one of the cooking utensils is raised, thereby chilling the responsive device and quickly increasing, at that time, the heat applied to the cooking chamber.

Other and further objects of my invention will become readily apparent to persons skilled in the art from a consideration of the following description when taken in conjunction with drawings, wherein—

Figure 1 is a large, vertical, central section of the utensil. Fig. 2 is a transverse section taken on line 2—2 of Fig. 1. Fig. 3 is a transverse section taken on line 3—3 of Fig. 1. Fig. 4 is an enlarged, vertical section of one side of the lower, or burner section, showing a fragment of one of the cooking sections superposed thereon.

In all the views the same reference characters are employed to indicate similar parts.

In a copending application, Serial No. 747,067, filed Feb. 8th, 1913 I have shown and claimed a device generally similar to the device disclosed in this application and therefore several of the features here shown are not specifically claimed.

In a particular embodiment, which I have shown for the purpose of clear disclosure of my invention, 10 is an open ended cylindrical burner-containing section provided with a strengthening bead 11, around its bottom edge and having near said bottom edge, a row of air admitting openings or apertures 12 and having a similar row near its top and an intermediate diaphragm or bottom 13 secured to the side wall, as by screws 13', whereby to support the burner. It is provided with a plurality of brackets 10', secured to the side wall by means of screws, which are adapted to support a superposed cooking vessel 14. The latter is provided with a bead 15 upon which to support another cooking vessel 16, and the vessel 16 is provided with a rim 17 in which to rest the lower edge 18 of another steaming or cooking vessel 19 or the cover 22. The upper vessel is provided with a similar rim 20 to receive the lower down turned edge 21 of the cover 22. The vessels 14 and 16 may be used together or separately, as desired, and when the vessel 14 or 16 is to be used separately, the edge 18 of the vessel 19 may rest in the bead 14' of the vessel 14. While the vessels are readily removable and interchangeable, one from the other, and one for the other, the joints connecting them are sufficiently tight to prevent material escape of steam or heat therefrom.

A gas burner 23, which may be of any convenient form or type, is provided with gas emitting apertures 24 and with a gas receiving chamber 25. A gas injecting tube 26, is fixed into one side of the wall of the chamber 25, and in the diaphragm casing 27. The casing 27 is divided into chambers 28 and 29, by means of a diaphragm 30. A cover top 31 is secured to the casing by means of screws 32. The diaphragm 30 is secured in an annular depression in the cover 31 by solder, or otherwise, as at 33. The diaphragm is adapted to be seated upon an annular rim, or valve seat 34, which surrounds the chamber 29. An open compression spring 35 is seated against the center of the diaphragm 30 and is adapted to be adjusted by means of the screw 36, which presses against a block 37, secured to the lower end of the spring. A similar block 38 is secured also to the upper end thereof and bears directly against the diaphragm. A nipple 39, to which a gas hose or pipe may be attached, admits gas into the central chamber 29, from which the gas will pass through the opening between the seat 34 and the lower surface of the diaphragm 30 into the chamber 28 and thence into the gas burner 25, when the diaphragm is not seated upon the seat, or upper surfaces of the wall, inclosing the chamber 29.

Secured in the top, or cover 31, is a pipe 40. A flue, or jacket 41, is secured in vertical position to one side of the wall of the section 10. The pipe 40 passes downwardly toward the bottom of the section 10 into a perforation made through the wall thereof, into the flue 41 and upon its upper end is connected to the lower end of the tube 42, which contains the heat responsive fluid 43.

The vessel 14 is provided with a similar flue section 44 which registers with the flue 41 and makes telescopic connection therewith, as shown at 45, in Fig. 4, thereby continuing the flue to a point near the top of the vessel 14, and another flue section or jacket 46 is similarly secured to the wall of the vessel 16 and has telescopic connection with the jacket or flue 46 of the section 16, so that the flue above the heat responsive device 42 may be included with each of the sections 14, or 16, and they may be placed one upon the other, above the burner as shown.

An opening 48 is made through the wall of the vessel 16 into the flue 46, and a similar opening 49, is made through the wall of the vessel 14 into the flue 44 of said vessel so that the air or heat, may equalize to some extent in the vessels and vapor or moisture may pass from the respective vessel down through the flue composed of the sections 46, 44, and 41 into contact with the heat responsive capsule 42. Near the lower extremity of the flue section 41 is an opening 50 through which steam or heated vapor or gas may pass into the chamber of the section 10 from the respective cooking vessels and through the apertures 48 and 49. The heat responsive device or capsule 42, the pipe 40, and the upper portion of the casing 27, is filled with a volatile or expansible fluid, that will become volatilized at a critical temperature so as to readily depress the diaphragm 30 and close the port communicating with the chamber 29, thereby shutting off the gas supply from the burner 35, or shutting it off proportionately as the diaphragm is depressed, and consequently regulating the intensity of the heat, and the size of the flame, issuing from the burner 25, proportional to the temperature within the cooking vessel.

The operation of the device is substantially as follows: With the parts in the positions shown, and the vessel 14 and 16, preferably containing water, and the inner vessels 52 and 53 containing suitable food, with food in the vessel 19 that is designed to be steamed, the burner may be lighted and the full head of gas will immediately be turned on, as a result of the separation of the diaphragm 30 from the valve seat 34, thereby permitting the gas to pass from the pipe 39, through the pipe 26, into the burner until sufficient temperature, within the cooking vessels 14 and 16, will create more or less pressure due to the expansion of the air or water contained in the vessels, when vapor, hot air or steam will pass through the openings 48 and 49 down through the flue sections 46 and 44 and 41, surrounding the heat responsive device 42, expanding the fluid therein, thereby depressing the diaphragm 30, to a greater or less extent, and closing the opening between the fuel inlet pipe 28 and the inner chamber 29, reducing the gas supply, to a greater or less extent, at the burner 25. Now should one of the vessels 14, 16, or 19 be lifted from its close fitting contact with the upper surface of the vessel immediately below, and the vapor pressure within the said vessel, thereby be released, air will then pass into the opening 50 and up the flue sections 41, 44, and 46, in a reverse direction, to the hot air coming down through the flue from said vessels, quickly chilling the heat responsive device 42, and contracting the expansible fluid 43 therein, permitting the spring 35 to press the diaphragm back off of the valve seat 34 and allowing a larger quantity of gas to pass into the burner. The tension of the spring 35 may be varied, by means of the adjusting screw 36, so that the movement of the diaphragm 30 will require a higher or lower temperature, as the case may be, to exist within the vessels 14 and 16 to operatively affect the diaphragm 30 in a manner heretofore described. If the tension of the spring 35 is adjusted, by means of the screw 36, so that steam will not exert maximum effect thereon, when the water has been substantially exhausted from the vessel 14, or 16, hotter dry heat will pass out through the openings 48 or 49, down the flue sections 46—44—41, expanding the fluid contained within the chamber or receptacle 42, to a greater extent than when steam only passes through said flue, and reduce the supply of fuel. By this means the contents of the vessels 14 or 16 is protected against burning, and therefore it is, for this reason, practically impossible to produce an intense heat from the burner 25, after the water has been exhausted from the vessels, as described. Now if any of the vessels be separated, so as to relieve the pressure therein, the heat contained in the flue, the lower end of which is open, will be forced out by reverse drafts of relatively cold air entering the bottom of the flue and passing out through the openings 48 and 49, thereby cooling the receptacle or capsule 42, just as when steam is present, which lowered temperature operates to condense the liquid within the responsive device and permits the spring to push the diaphragm farther away from the port controlling the gas burner and therefore a greater quantity of gas will enter the burner, and increase the size of the flame and consequently produce a corresponding increase of heat, while the vessels, or any one thereof is open. It is of course evident that the vessels 19 and 14 may be used together without the intermediate vessel 16, in which event a stopper or closure for the flue section 44 should be placed at the upper end of the flue to prevent gases from escaping from the top of the flue to the outside atmosphere. In this event the section 16 may be used in connection with the section 19 and the section 14 removed.

While I have herein shown and described a single embodiment of my invention for purpose of clear disclosure, it is evident that changes may be made in the structure within the spirit and scope of the appended claims.

Having described my invention, what I claim is:—

1. A device of the character described comprising a separable burner section and a removable, superposed food container section; controllable means for fuel supplied to the burner, in said burner section; a responsive means for controlling said fuel-controlling means; a food section; a flue opening into said food section and open to the atmosphere at its lower end, each vessel carrying a section of said flue, said heat responsive means located in the flue section carried by the burner section whereby heated vapor or gases escaping from said food section must pass through both flue sections to the atmosphere and a cooling blast of air will pass through said flue when said food section is open.

2. A device of the character described comprising a separable burner section and a plurality of removable, interchangeable food container sections superposed upon said burner section, one above the other; controllable means for fuel supplied to the burner, in said burner section; a heat responsive means for controlling said fuel-controlling means; a flue opening into each said food section, near their respective upper edges, and open to the atmosphere at its lower end, each vessel carrying a section of said flue, said heat responsive means located in the flue section of the burner section whereby heated gases or vapor escaping from either or both said food sections must pass downward through said flues to the atmosphere and a cooling blast of air will be drawn through said flue when either said food section is opened whereby to increase the fuel supply through said burner.

In testimony whereof I hereunto set my hand in the presence of two witnesses.

NOAH S. HARTER.

In the presence of—
J. J. DEITMEYER,
FRANK P. TYLER.